United States Patent
Li et al.

(10) Patent No.: US 9,780,998 B2
(45) Date of Patent: Oct. 3, 2017

(54) METHOD AND APPARATUS FOR MANAGING PHYSICAL NETWORK INTERFACE CARD, AND PHYSICAL HOST

(71) Applicant: Huawei Technologies Co., Ltd., Shenzhen (CN)

(72) Inventors: Lijun Li, Hangzhou (CN); Xiaofeng Zhang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 240 days.

(21) Appl. No.: 14/676,191

(22) Filed: Apr. 1, 2015

(65) Prior Publication Data

US 2015/0207678 A1    Jul. 23, 2015

Related U.S. Application Data

(63) Continuation of application No. PCT/CN2013/073414, filed on Mar. 29, 2013.

(30) Foreign Application Priority Data

Oct. 25, 2012 (CN) .......................... 2012 1 0413377

(51) Int. Cl.
| | |
|---|---|
| *H04L 12/24* | (2006.01) |
| *G06F 9/455* | (2006.01) |
| *H04L 12/721* | (2013.01) |
| *H04L 12/713* | (2013.01) |
| *H04L 29/12* | (2006.01) |

(52) U.S. Cl.
CPC ...... *H04L 41/0806* (2013.01); *G06F 9/45558* (2013.01); *H04L 41/08* (2013.01);
(Continued)

(58) Field of Classification Search
CPC ..... H04L 49/30; H04L 49/3009; H04L 41/12; H04L 41/0806; H04L 41/0896;
(Continued)

(56) References Cited

U.S. PATENT DOCUMENTS

| | | | |
|---|---|---|---|
| 2005/0076155 A1 | 4/2005 | Lowell | |
| 2008/0002739 A1* | 1/2008 | Droux | ................. H04L 41/0896 370/468 |

(Continued)

FOREIGN PATENT DOCUMENTS

| | | |
|---|---|---|
| CN | 102368725 A | 3/2012 |
| CN | 102609298 A | 7/2012 |
| CN | 102932174 A | 2/2013 |

OTHER PUBLICATIONS

"PCI-SI G SR-I OV Primer: An Introduction to SR-I OV Technology," Intel Lan Access Division, Intel, 321211-002, Revision 2.5, Jan. 31, 2011, 28 pages.

(Continued)

*Primary Examiner* — Kwang B Yao
*Assistant Examiner* — Ricardo Castaneyra
(74) *Attorney, Agent, or Firm* — Conley Rose, P.C.

(57) ABSTRACT

A method and an apparatus for managing one or more physical network interface cards and a physical host are provided. One or more virtual network interface cards are created, where each of the virtual network interface cards has a standard network interface card feature and an operation interface; the one or more virtual network interface cards are separately associated with one or more function modules of the physical network interface cards; and the physical network interface cards are managed by managing the one or more virtual network interface cards. In this way, differences in underlying hardware are shielded for an upper layer, and convenient and efficient centralized management are provided, thereby further improving network resource utilization.

18 Claims, 10 Drawing Sheets

(52) U.S. Cl.
CPC ...... *H04L 41/0843* (2013.01); *H04L 41/0896* (2013.01); *H04L 45/38* (2013.01); *H04L 45/586* (2013.01); *H04L 61/2038* (2013.01); *G06F 2009/45595* (2013.01); *H04L 41/0803* (2013.01); *H04L 61/6004* (2013.01)

(58) Field of Classification Search
CPC . H04L 41/0843; H04L 41/0803; H04L 41/08; H04L 45/586; H04L 45/38; H04L 61/2038; H04L 61/6004; G06F 9/45558; G06F 2009/45595
See application file for complete search history.

(56) References Cited

U.S. PATENT DOCUMENTS

| | | | |
|---|---|---|---|
| 2009/0219936 A1* | 9/2009 | Tripathi | .......... H04L 12/24 370/392 |
| 2012/0054393 A1 | 3/2012 | Yoshimura et al. | |

OTHER PUBLICATIONS

Foreign Communication From a Counterpart Application, European Application No. 13849266.5, Extended European Search Report dated Aug. 27, 2015, 8 pages.
Partial English Translation and Abstract of Chinese Patent Application No. CN102368725A, dated Apr. 16, 2015, 4 pages.
Partial English Translation and Abstract of Chinese Patent Application No. CN102609298A, dated Apr. 16, 2015, 4 pages.
Partial English Translation and Abstract of Chinese Patent Application No. CN102932174A, dated Apr. 16, 2015, 3 pages.
Foreign Communication From a Counterpart Application, PCT Application No. PCT/CN2013/073414, English Translation of International Search Report dated Aug. 8, 2013, 2 pages.
Foreign Communication From a Counterpart Application, PCT Application No. PCT/CN2013/073414, English Translation of Written Opinion dated Aug. 8, 2013, 13 pages.

* cited by examiner

METHOD AND APPARATUS FOR MANAGING PHYSICAL NETWORK INTERFACE CARD, AND PHYSICAL HOST

CROSS-REFERENCE TO RELATED APPLICATIONS

This application is a continuation of International Application No. PCT/CN2013/073414, filed on Mar. 29, 2013, which claims priority to Chinese Patent Application No. 201210413377.0, filed on Oct. 25, 2012, both of which are hereby incorporated by reference in their entireties.

TECHNICAL FIELD

The present invention relates to computer technologies, and in particular, to a method and an apparatus for managing one or more physical network interface cards, and a physical host.

BACKGROUND

Virtualization is a hot technology of an existing data center, and a core meaning of virtualization is to help a data center and a large-scale workstation to improve the flexibility and response capability for an environment to a new level at a lower cost.

Nowadays, central processing unit (CPU) and memory virtualization technologies develop rapidly, but Input/Output (IO) virtualization relatively lags behind, which becomes a performance bottleneck for the rapid development of the virtualization technologies. Many hardware manufacturers propose and use different solutions for the IO virtualization technology. A network device is an essential part of a server in a data center. To improve virtualization performance of a network device, some new virtualization technologies are continuously applied to new network interface cards, such as an Single Root I/O Virtualization (SRIOV) technology and a Virtual Machine Device Queue (VMDQ) technology. However, due to a cost problem, a large number of original conventional Network Interface Cards (NICs) continue to be used; therefore, in an equipment room of a modern large-scale data center, a common network interface card, an SRIOV network interface card, and a VMDQ network interface card all are used as network devices (which may be regarded as network resources), and these heterogeneous network interface cards are used in different manners. Currently, in a server, basically an administrator performs manual management, or a control and management program dynamically allocates a network resource to a virtual machine, where the virtual machine that obtains the resource can exclusively use the allocated network resource. However, as the number of servers increases, management of a large number of heterogeneous network interface cards is disorganized, and a centralized management and allocation mechanism cannot be implemented, which further leads to low network resource utilization.

SUMMARY

Embodiments of the present invention provide a method and an apparatus for managing one or more physical network interface cards, and a physical host, which implement convenient and efficient centralized management of a large number of heterogeneous physical network interface cards, thereby further improving network resource utilization.

To solve the foregoing problems, the embodiments of the present invention provide the following technical solutions.

According to a first aspect, an embodiment of the present invention provides a method for managing one or more physical network interface cards, where the physical network interface cards are configured to connect to a network resource, the method is applied to a physical host on which one or more virtual machines run, and the method includes creating one or more virtual network interface cards (VNs), where the VN has a standard network interface card feature and operation interface; separately associating the one or more VNs with one or more function modules of the physical network interface cards, where a function module of the physical network interface cards and a VN associated with the function module is communicated with each other by using a data flow and a control flow, the data flow is used to send and receive a data packet between the function module of the physical network interface card and the VN associated with the function module, and the control flow is used by the VN to control the function module, associated with the VN, of the physical network interface cards; and managing the physical network interface cards by managing the one or more VNs.

In a first implementation manner, the separately associating the one or more VNs with one or more function modules of the physical network interface cards includes, for each of the VNs, configuring a data flow interface for the VN, where the data flow interface includes a data packet transmit interface and a data packet receive interface between the VN and the function module, corresponding to the VN, of the physical network interface cards; configuring a Media Access Control (MAC) address of the VN to a MAC address of the function module, corresponding to the VN, of the physical network interface cards; configuring bandwidth of the VN; registering a sysfs interface and a procfs interface for the VN, where the sysfs interface and the procfs interface are configured to control registration and destruction of the VN; and registering the VN with an operating system kernel.

With reference to the first aspect or the first implementation manner of the first aspect, in a second implementation manner, the managing the physical network interface cards by managing the one or more VNs includes, for each of the one or more virtual machines, determining, according to a bandwidth requirement of the one or more virtual machines, one or more VNs meeting the bandwidth requirement, where the one or more VNs are associated with one or more function modules of a same physical network interface card or the one or more VNs are associated with one or more function modules of different physical network interface cards; and allocating the one or more VNs to the virtual machine for use.

According to a second aspect, an embodiment of the present invention provides an apparatus for managing one or more physical network interface cards, where the apparatus includes a VN creating unit configured to create one or more VNs, where the VN has a standard network interface card feature and operation interface; a VN associating unit configured to separately associate the one or more VNs with one or more function modules of the physical network interface cards, where a function module of the physical network interface card and a VN corresponding to the function module is communicated with each other by using a data flow and a control flow, the data flow is used to send and receive a data packet between the function module of the physical network interface card and the VN associated with the function module, and the control flow is used by the VN to control the function module of the physical network interface cards; and a VN managing unit configured to manage the physical network interface cards by managing the one or more VNs.

In a first implementation manner, the VN associating unit is configured to, for each of the VNs, configure a data flow interface for the VN, where the data flow interface includes a data packet transmit interface and a data packet receive interface between the VN and the function module, corresponding to the VN, of the physical network interface cards; configure a MAC address of the VN to a MAC address of the function module, corresponding to the VN, of the physical network interface cards; configure bandwidth of the VN; register a sysfs interface and a procfs interface for the VN, where the sysfs interface and the procfs interface are configured to control registration and destruction of the VN; and register the VN with an operating system kernel.

With reference to the second aspect or the first implementation manner of the second aspect, in a second implementation manner, the VN managing unit is configured to, for each of the one or more virtual machines, determine, according to a bandwidth requirement of the virtual machine, one or more VNs meeting the bandwidth requirement, where the one or more VNs are associated with one or more function modules of a same physical network interface card or the one or more VNs are associated with one or more function modules of different physical network interface cards; and allocate the one or more VNs to the virtual machine for use.

According to a third aspect, an embodiment of the present invention provides a physical host, where the physical host includes a hardware layer, a virtual machine monitor (VMM) running above the hardware layer, and a virtual machine running above the VMM, where the hardware layer includes one or more physical network interface cards; and the VMM includes the apparatus for managing one or more physical network interface cards in any one of the embodiments of the present invention, where the apparatus for managing one or more physical network interface cards is configured to manage the one or more physical network interface cards at the hardware layer by managing one or more VNs, to help the virtual machines to use the one or more physical network interface cards at the hardware layer.

As can be seen, the embodiments of the present invention provide a method, an apparatus, and a physical host for managing one or more physical network interface cards, where one or more VNs are correspondingly constructed for the physical network interface cards or one or more function modules of the physical network interface cards, where these VNs have a same data structure and interface. In this way, differences in underlying hardware are shielded for an upper layer, and convenient and efficient centralized management are provided, thereby further improving network resource utilization.

BRIEF DESCRIPTION OF THE DRAWINGS

To describe the technical solutions in the embodiments of the present invention more clearly, the following briefly introduces the accompanying drawings required for describing the embodiments or the prior art. The accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The described embodiments are merely some but not all of the embodiments of the present invention. All other embodiments obtained by a person of ordinary skill in the art based on the embodiments of the present invention without creative efforts shall fall within the protection scope of the present invention.

Figure 1A:
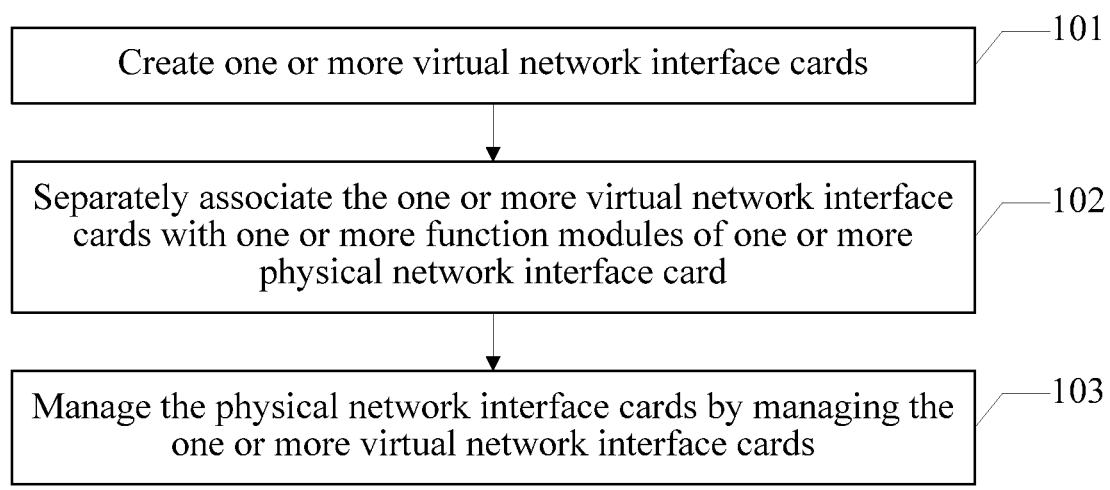
FIG. 1A is a schematic flowchart of a method for managing one or more physical network interface cards according to an embodiment of the present invention.

Refer to FIG. 1A, which is a schematic flowchart of a method for managing one or more physical network interface cards according to an embodiment of the present invention. The physical network interface cards are configured to connect to a network resource (therefore, a physical network interface card in the following embodiment introduction may be construed as indicating network resources), the method is applied to a physical host on which one or more virtual machines run, and the method includes the following steps.

S101. Create one or more VNs.

The VNs may have a same network interface card feature and operation interface, for example, the VNs have same bandwidth.

S102. Separately associate the one or more VNs with one or more function modules of the physical network interface cards, where a function module of the physical network interface cards and a VN associated with the function module is communicated with each other by using a data flow and a control flow, the data flow is used to send and receive a data packet between the function module of the physical network interface cards and the VN associated with the function module, and the control flow is used by the VN to control the function module, associated with the VN, of the physical network interface cards.

S103. Manage the physical network interface cards by managing the one or more VNs.

As can be seen, according to the method for managing one or more physical network interface cards provided in this embodiment of the present invention, VNs are correspondingly constructed for each physical network interface card or each function module of a physical network interface card, where these VNs have a same data structure and interface. In this way, differences in underlying hardware are shielded for an upper layer, a uniform interface and device type are provided, and resource management and allocation are implemented for a large number of heterogeneous network interface cards, thereby further improving network resource utilization.

Figure 1B:
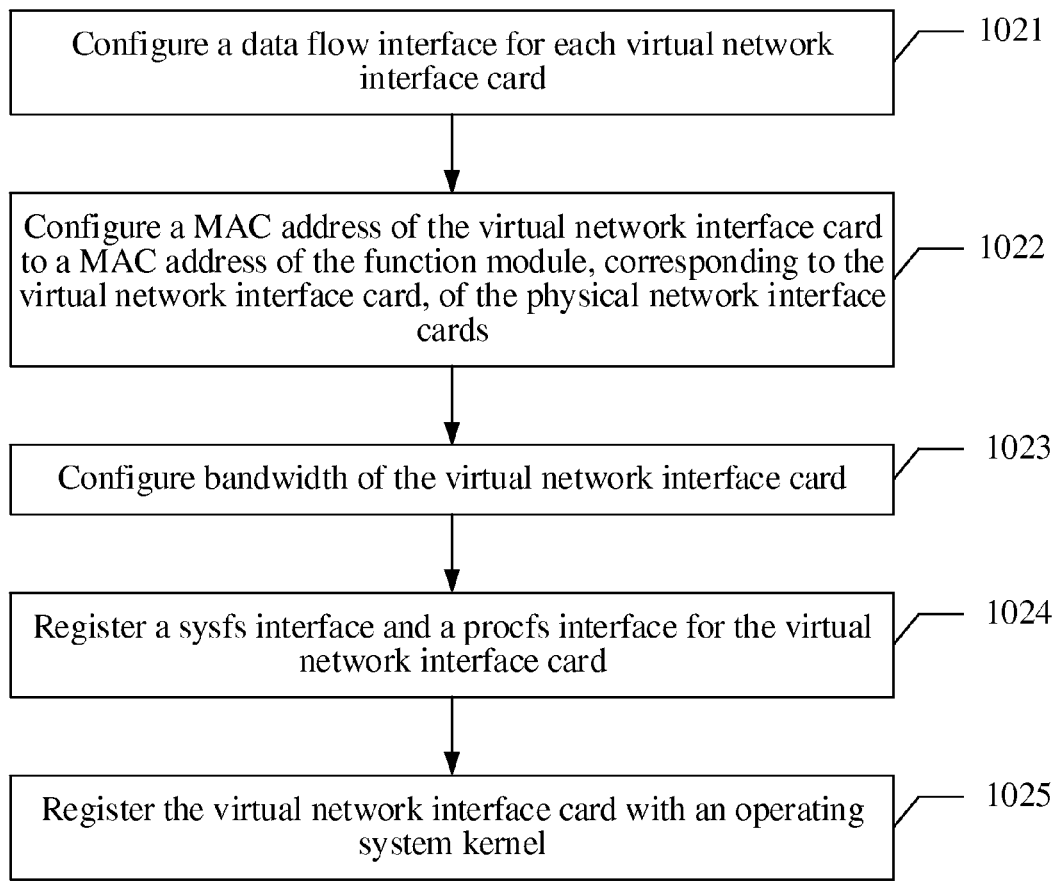
FIG. 1B is a schematic flowchart of another method for managing one or more physical network interface cards according to an embodiment of the present invention.

In some embodiments of the present invention, as shown in FIG. 1B, step S102 includes the following step.

S1021. For each of the VNs, configure a data flow interface for the VN, where the data flow interface includes a data packet transmit interface and a data packet receive interface between the VN and the function module, corresponding to the VN, of the physical network interface cards.

S1022. Configure a MAC address of the VN to a MAC address of the function module, corresponding to the VN, of the physical network interface cards.

S1023. Configure bandwidth of the VN.

S1024. Register a sysfs interface and a procfs interface for the VN, where the sysfs interface and the procfs interface are used to control registration and destruction of the VN, and Procfs and sysfs are two file management systems of linux.

S1025. Register the VN with an operating system kernel.

Figure 1C:
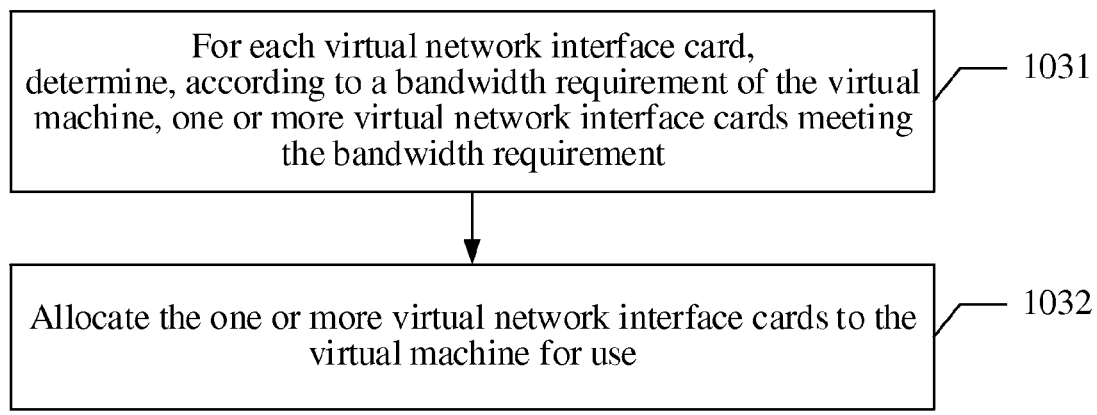
FIG. 1C is a schematic flowchart of another method for managing one or more physical network interface cards according to an embodiment of the present invention.

In some embodiments of the present invention, as shown in FIG. 1C, step S103 includes the following steps.

S1031. For each of the one or more virtual machines, determine, according to a bandwidth requirement of the virtual machine, one or more VNs meeting the bandwidth requirement, where the one or more VNs are associated with one or more function modules of a same physical network interface card or the one or more VNs are associated with one or more function modules of different physical network interface cards.

S1032. Allocate the one or more VNs to the virtual machine for use.

In some embodiments of the present invention, the physical network interface card may be an SRIOV network interface card, a VMDQ network interface card, or a common network interface card, or any two or three of the foregoing network interface cards may simultaneously exist in a same physical host. The common network interface card in this embodiment of the present invention is another network interface card except network interface cards using SRIOV and VMDQ technologies. When the physical network interface card is an SRIOV network interface card, the function modules of the physical network interface card include a VF and a Physical Function (PF); when the physical network interface card is a VMDQ network interface card, the function modules of the physical network interface card include VQs; and when the physical network interface card is a common network interface card, the common network interface card is a function module of the physical network interface card.

It should be noted that in the present invention, it is not limited that the physical network interface card must be one or more of the foregoing three types of network interface cards. A person skilled in the art applies, according to the technical solutions disclosed in this embodiment of the present invention without creative efforts, the technical solutions disclosed in this embodiment of the present invention to more types of network interface cards in future, which shall also fall within the protection scope of the present invention.

As can be seen, according to the method for managing one or more physical network interface cards provided in this embodiment of the present invention, VNs are correspondingly constructed for each physical network interface card or each function module of a physical network interface card, where these VNs have a same data structure and interface. In this way, differences in underlying hardware are shielded for an upper layer, a uniform interface and device type are provided, and resource management and allocation are implemented for a large number of heterogeneous network interface cards, thereby further improving network resource utilization.

Implementation of the technical solutions of the present invention is described in detail below by using some specific embodiments.

Figure 2:
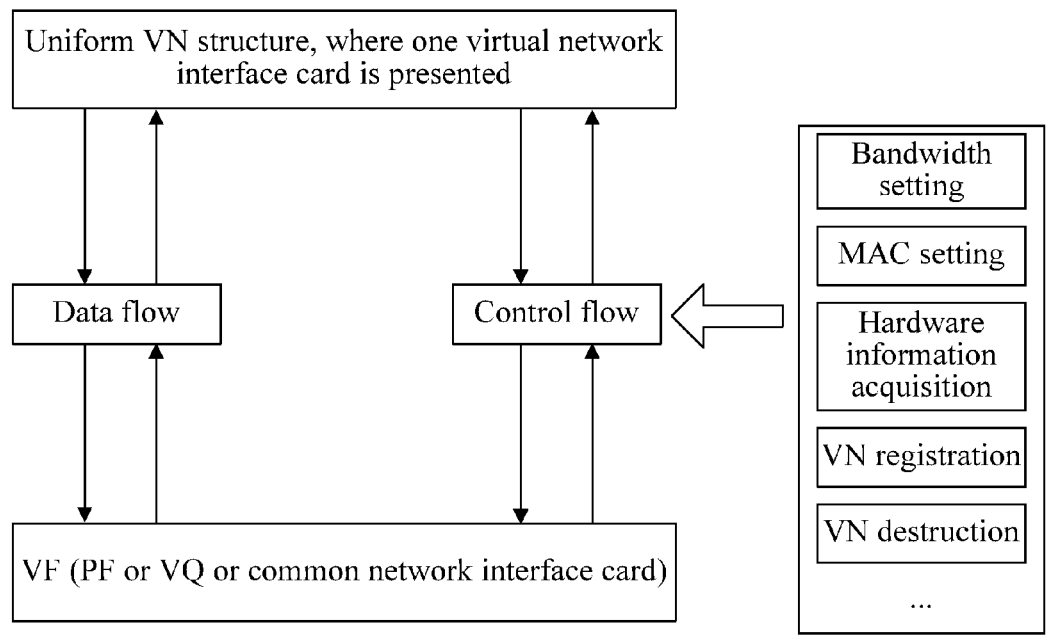
FIG. 2 is a schematic diagram of a principle of creating a VN according to an embodiment of the present invention.

FIG. 2 is a schematic diagram of a principle of creating a VN according to an embodiment of the present invention. Two paths need to be implemented between a VF (PF or VQ or common network interface card) and a VN, where one path is a data flow, mainly responsible for sending and receiving a data packet; and the other path is a control flow, mainly responsible for controlling the VF (PF or VQ or common network interface card) by the VN, such as bandwidth setting, MAC setting, hardware information acquisition, and VN registration and destruction. Network interface cards of all structures or function modules of the network interface cards need to process the data flow and the control flow, so as to implement conversion to a VN.

Figure 3:
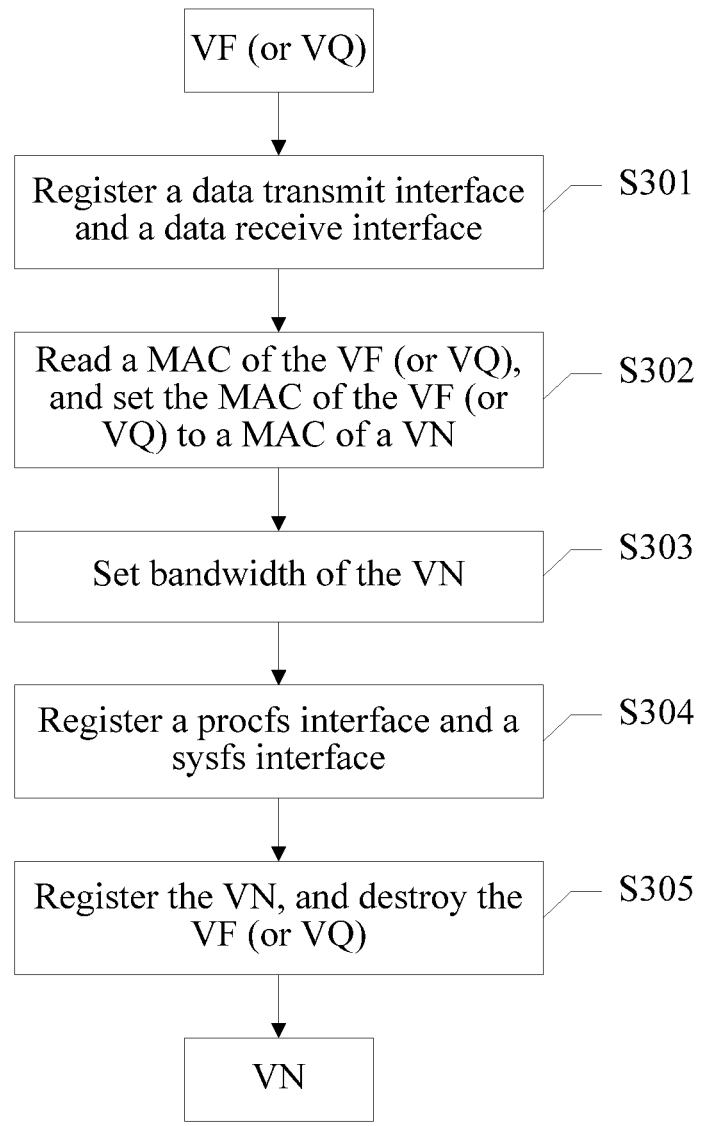
FIG. 3 is a schematic flowchart of implementing a Virtual Function (VF) or Virtual Queue (VQ) as a VN according to an embodiment of the present invention.

FIG. 3 is a schematic flowchart of implementing a VF as a VN according to an embodiment of the present invention. The process includes the following steps.

S301. Register a data flow interface of a VN with an operating system kernel, including registering a data transmit interface and a data receive interface.

A specific implementation may be setting a callback function, where when an operating system needs to use the VN to send and receive data, the callback function is used to call a previously registered interface.

S302. Read a MAC of a VF, and set the MAC of the VF as a MAC of the VN. In some other embodiments of the present invention, if the VF does not have a MAC, a MAC is randomly generated.

S303. Set bandwidth of the VN. The bandwidth of the VN may be consistent with bandwidth of the VF corresponding to the VN.

S304. Register a procfs interface and a sysfs interface. In this way, registration and destruction of the VN can be controlled by using user space.

User space is referred to relative to kernel space, and refers to a run level in an operating system. User programs all work in user space, and an operating system kernel runs in kernel space. The step may enable a user or an administrator to operate an interface by using a command, to control registration and destruction of the VN.

S305. Register the VN with an operating system kernel, to implement a VN device, and destroy an original VF device.

Destroying an original VF device is removing the VF device from a network framework of a system; in this way, a user cannot view or operate the VF device by using a network command. An objective of this action is to prevent the user from improperly operating the VF device, and affect normal use of the VN.

Certainly, for a PF and a VQ, a VN may also be implemented by using the method shown in FIG. 3.

Figure 4:
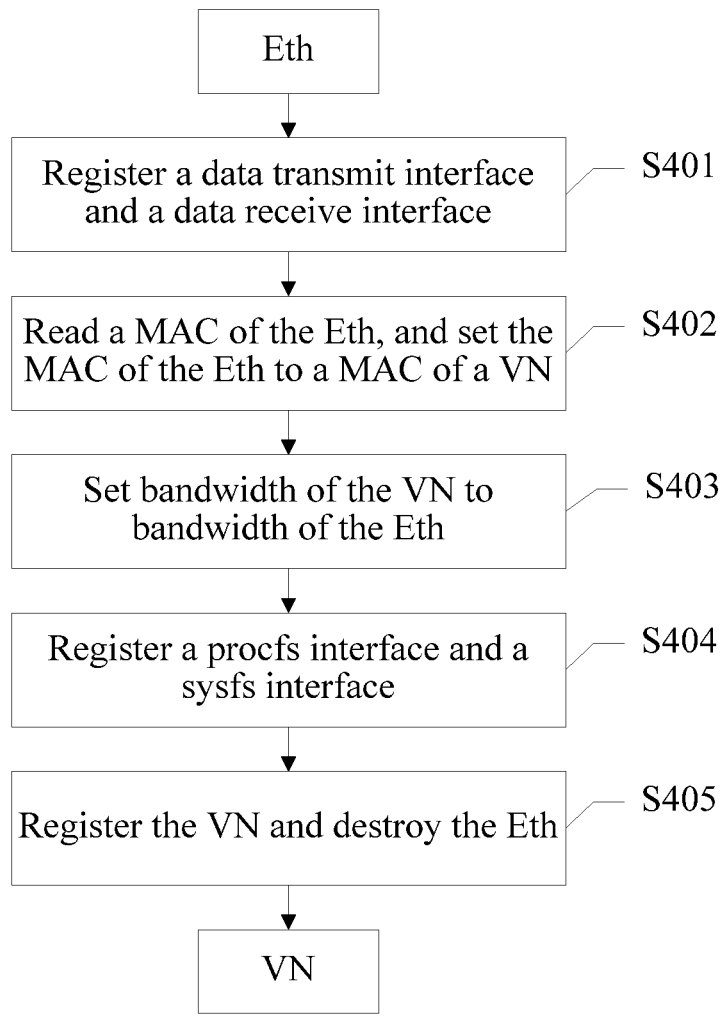
FIG. 4 is a schematic flowchart of implementing a common network interface card as a VN according to an embodiment of the present invention.

FIG. 4 is a schematic flowchart of implementing a common network interface card Eth as a VN according to an embodiment of the present invention, where the Eth refers to a common network interface card, such as a Realtek® 8139 network interface card, which is referred to relative to an advanced network interface card. In Linux, a name of a network interface card generally begins with Eth. As shown in FIG. 4, the method includes the following steps.

S401. Register a data flow interface of a VN with an operating system kernel, including registering a data transmit interface and a data receive interface.

S402. Read a MAC of an Eth, and set the MAC of the Eth as a MAC of the VN. In some other embodiments of the present invention, if the Eth does not have a MAC, a MAC is randomly generated.

S403. Set bandwidth of the VN to bandwidth of the Eth.

S404. Register a procfs interface and a sysfs interface. In this way, registration and destruction of the VN can be controlled by using user space.

S405. Register the Eth with an operating system kernel, to implement a VN device, and destroy an original VF device.

Figure 5:
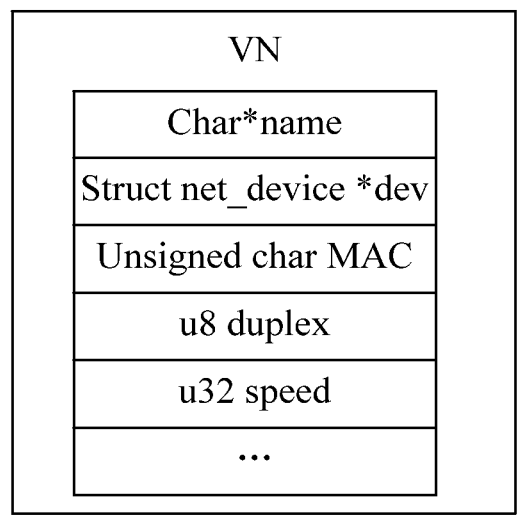
FIG. 5 is an exemplary diagram of a data structure of a VN according to an embodiment of the present invention.

FIG. 5 is an exemplary diagram of a data structure of a VN according to an embodiment of the present invention, where name is a name of a VN, which may be set to an identifier for uniquely determining a VN; dev is associated with a data structure of an original network interface card; MAC is a MAC address of the VN; duplex indicates a duplex manner of the VN; and speed indicates bandwidth of the VN. The part before each of the foregoing items is an item type defined in the program language.

A person skilled in the art should understand that FIG. 5 only shows an example of implementing a VN in a program language, and a person of ordinary skill in the art can obtain other implementation manners of a VN by using FIG. 5 and the technical solutions disclosed in this application. A structure of a VN in this application is not limited to that in FIG. 5.

To sum up, according to the method for managing one or more physical network interface cards provided in this embodiment of the present invention, VNs are correspondingly constructed for each physical network interface card or each function module of a physical network interface card, where these VNs have a same data structure and interface. In this way, differences in underlying hardware are shielded for an upper layer, a uniform interface and device type are provided, and resource management and allocation are implemented for a large number of heterogeneous network interface cards, thereby further improving network resource utilization. For example, when a guest operating system requires 11 gigabits per second (G) bandwidth, if an Input Output (IO) virtual pool is not used, the requirement of the guest operating system cannot be met because bandwidth of a single network interface card is only 10G. However, if an IO virtual pool is used, 11 VNs are directly taken out and bandwidth of each VN is 1G, which is aggregated into one VN. In this way, 11G bandwidth can be provided for a virtual machine, and a characteristic that conventional network interface cards such as an SRIOV network interface card and a VMDQ network interface card are heterogeneous and cannot be aggregated, is completely shielded.

Figure 6:
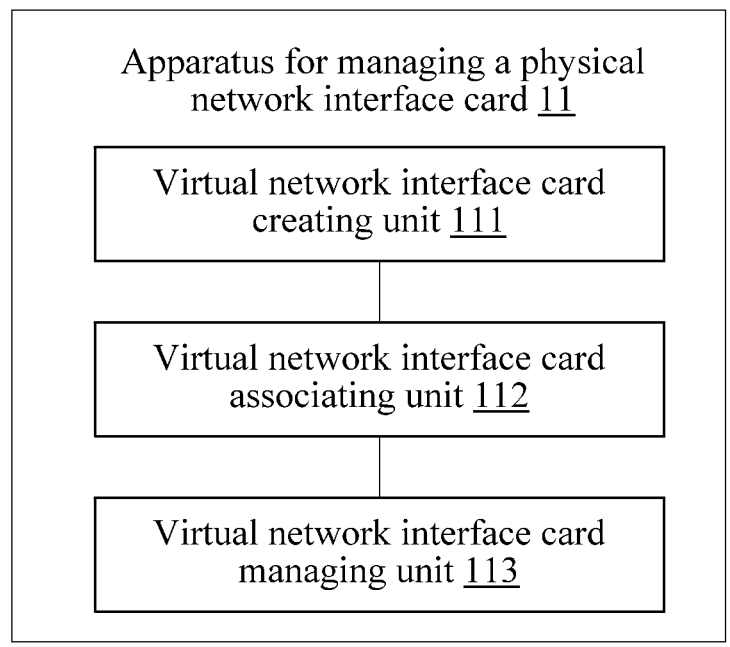
FIG. 6 is a schematic structural diagram of an apparatus for managing one or more physical network interface cards according to an embodiment of the present invention.

Refer to FIG. 6, which is a schematic structural diagram of an apparatus 11 for managing one or more physical network interface cards according to an embodiment of the present invention. The apparatus includes a VN creating unit 111, a VN associating unit 112, and a VN managing unit 113.

The VN creating unit 111 is configured to create one or more VNs, where the VN has a standard network interface card feature and operation interface.

The VN associating unit 112 is configured to separately associate the one or more VNs with one or more function modules of the physical network interface cards, where a function module of the physical network interface cards and a VN corresponding to the function module is communicated with each other by using a data flow and a control flow, the data flow is used to send and receive a data packet between the function module of the physical network interface card and the VN associated with the function module, and the control flow is used by the VN to control the function module of the physical network interface cards.

In some embodiments of the present invention, the VN associating unit 112 is configured to, for each of the VNs, configure a data flow interface for the VN, where the data flow interface includes a data packet transmit interface and a data packet receive interface between the VN and the function module, corresponding to the VN, of the physical network interface cards; configure a MAC address of the VN to a MAC address of the function module, corresponding to the VN, of the physical network interface cards; configure bandwidth of the VN; register a sysfs interface and a procfs interface for the VN, where the sysfs interface and the procfs interface are configured to control registration and destruction of the VN; and register the VN with an operating system kernel.

The VN managing unit 113 is configured to manage the physical network interface cards by managing the one or more VNs.

In some embodiments of the present invention, the VN managing unit 113 is configured to, for each of the one or more virtual machines, determine, according to a bandwidth requirement of the virtual machine, one or more VNs meeting the bandwidth requirement, where the one or more VNs are associated with one or more function modules of a same physical network interface card or the one or more VNs are associated with one or more function modules of different physical network interface cards; and allocate the one or more VNs to the virtual machine for use.

In this embodiment of the present invention, the physical network interface cards include an SRIOV network interface card, a VMDQ network interface card and/or a common network interface card. When the physical network interface card is an SRIOV network interface card, the function modules of the physical network interface card include a VF and a PF; when the physical network interface card is a VMDQ network interface card, the function modules of the physical network interface card include VQs; and when the physical network interface card is a common network interface card, the common network interface card is a function module of the physical network interface card.

It should be noted that for a specific implementation of the apparatus for managing one or more physical network interface cards provided in this embodiment of the present invention, reference may be made to the foregoing method embodiments, and details are not described herein again.

To sum up, with the apparatus for managing one or more physical network interface cards provided in this embodiment of the present invention, VNs are correspondingly constructed for each physical network interface card or each function module of a physical network interface card, where these VNs have a same data structure and interface. In this way, differences in underlying hardware are shielded for an upper layer, a uniform interface and device type are provided, and centralized resource management and allocation are implemented for a large number of heterogeneous network interface cards, thereby further improving network resource utilization.

Figure 7:
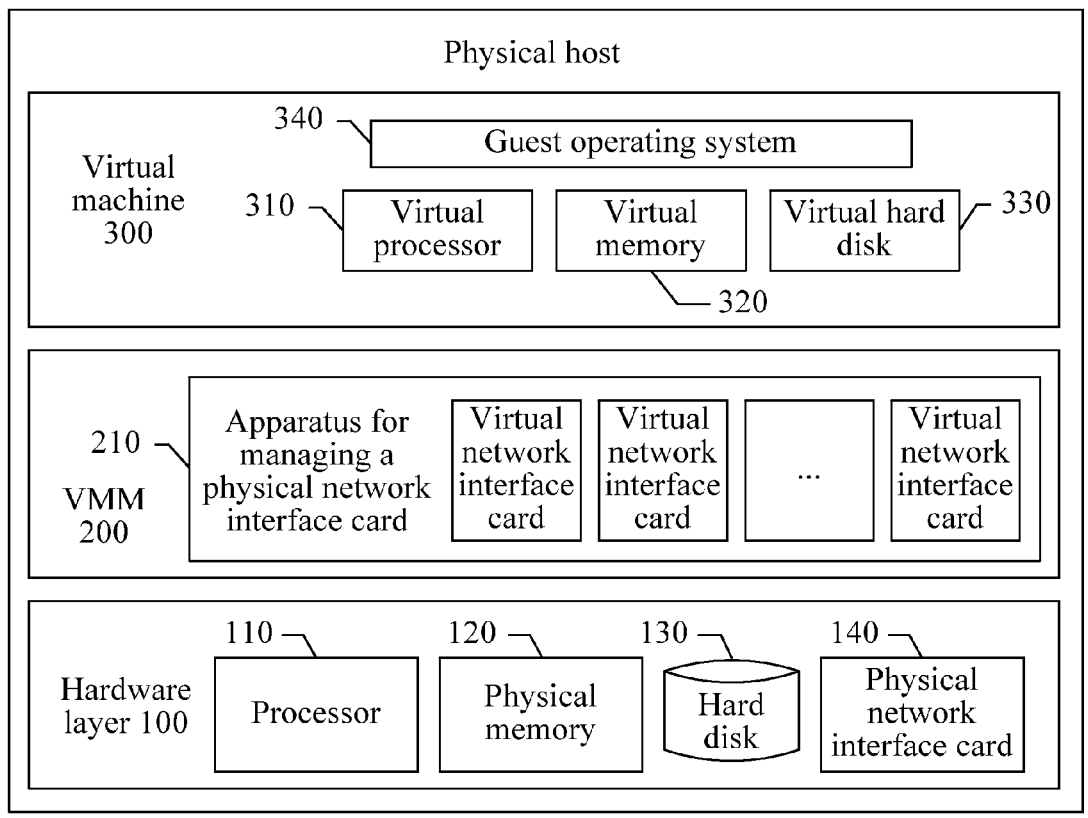
FIG. 7 is a schematic structural diagram of a physical host according to an embodiment of the present invention.

Refer to FIG. 7, which is a schematic structural diagram of a physical host according to an embodiment of the present invention. The physical host includes a hardware layer 100, a VMM 200 running above the hardware layer 100, and a virtual machine 300 running above the VMM 200, where there may be one or more virtual machines.

The hardware layer includes one or more physical network interface cards 140; and in addition, the hardware layer further includes a processor 110, a physical memory 120, and a hard disk 130.

The VMM 200 includes an apparatus 210 for managing one or more physical network interface cards in any one of the embodiments of the present invention, where the apparatus 210 for managing one or more physical network interface cards is configured to manage the physical network interface card 140 at the hardware layer 100 by managing a VN, to help the virtual machine 300 to use the physical network interface card 140 at the hardware layer 100. Certainly, the VMM 200 may further include other modules existing in the prior art.

The apparatus 210 for managing one or more physical network interface cards is configured to create one or more VNs; separately associate the one or more VNs with one or more function modules of the physical network interface cards, where a function module of the physical network interface card and a VN associated with the function module is communicated with each other by using a data flow and a control flow, the data flow is used to send and receive a data packet between the function module of the physical network interface cards and the VN associated with the function module, and the control flow is used by the VN to control the function module, associated with the VN, of the physical network interface cards; and manage the physical network interface cards by managing the one or more VNs.

In some embodiments of the present invention, the apparatus 210 for managing one or more physical network interface cards may include a VN creating unit configured to create one or more VNs; a VN associating unit configured to separately associate the one or more VNs with one or more function modules of the physical network interface cards, where a function module of the physical network interface card and a VN corresponding to the function module is communicated with each other by using a data flow and a control flow, the data flow is used to send and receive a data packet between the function module of the physical network interface cards and the VN associated with the function module, and the control flow is used by the VN to control the function module of the physical network interface cards; and a VN managing unit configured to manage the physical network interface cards by managing the one or more VNs.

In addition, for a specific implementation or division of function modules of the apparatus 210 for managing one or more physical network interface cards, reference may be made to description in the foregoing method and apparatus embodiments.

The virtual machine 300 includes a guest operating system 340, a virtual processor 310, a virtual memory 320, and a virtual hard disk 330, and uses and manages the VN by using the apparatus 210 for managing one or more physical network interface cards provided by the VMM 200.

Figure 8:
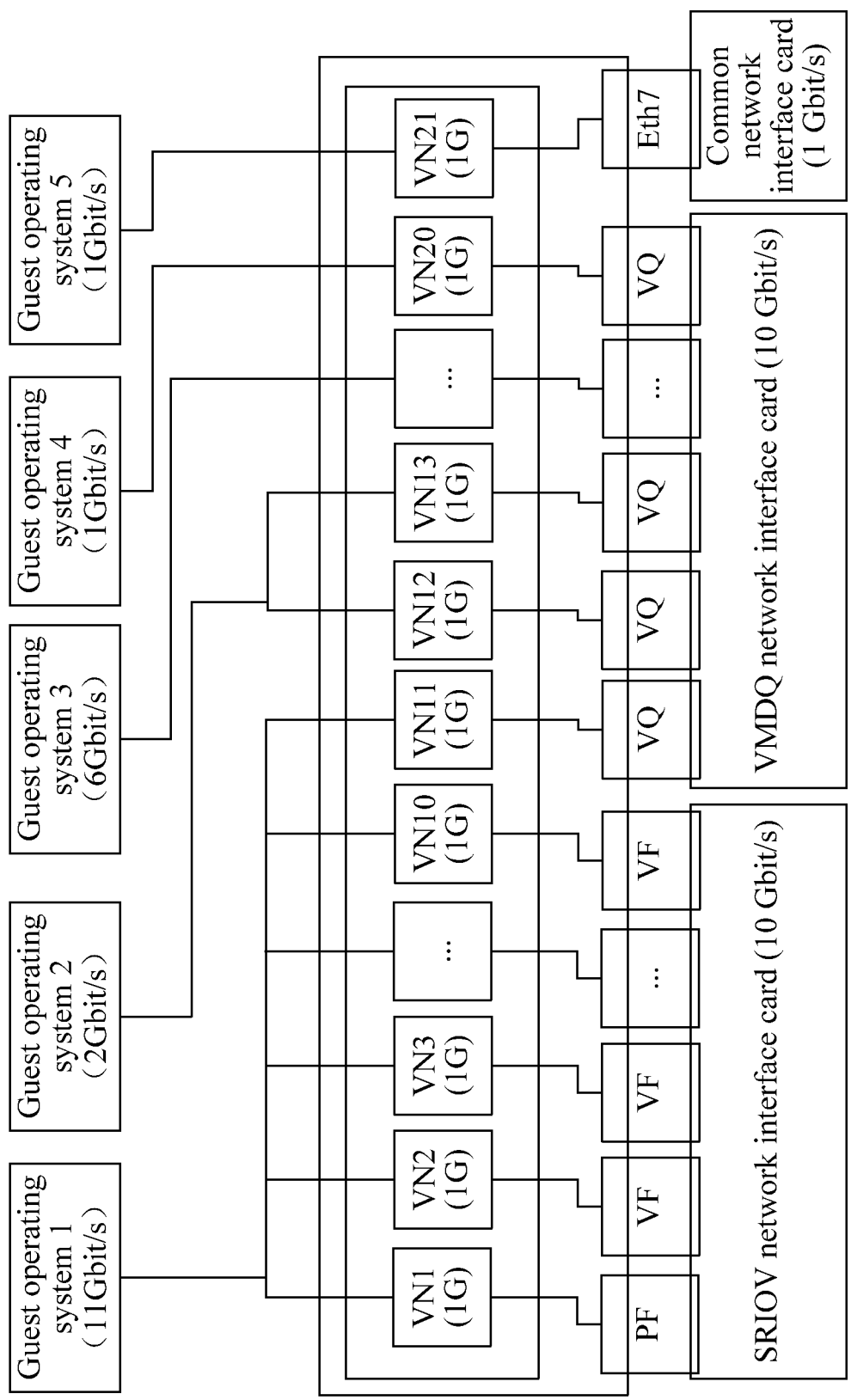
FIG. 8 is a schematic structural diagram of another physical host according to an embodiment of the present invention.

Refer to FIG. 8, which is a schematic structural diagram of another physical host according to an embodiment of the present invention. The physical host includes multiple guest operating systems (which may also be construed as including multiple virtual machines), where guest operating system 1 requires 11 gigabits per second (Gbit/s) bandwidth, guest operating system 2 requires 2 Gbit/s bandwidth, guest operating system 3 requires 6 Gbit/s bandwidth, and guest operating system 4 and guest operating system 5 both require 1 Gbit/s bandwidth. The physical host further includes multiple heterogeneous physical network interface cards an SRIOV network interface card, a VMDQ network interface card, and a common network interface card, where bandwidth of the SRIOV network interface card is 10 Gbit/s, bandwidth of the VMDQ network interface card is 10 Gbit/s, and bandwidth of the common network interface card Eth 7 (where the Eth 7 is an example of a common network interface card in the Linux operating system) is 1 Gbit/s.

As shown in FIG. 8, each of one PF and multiple VFs of the SRIOV network interface card is associated with one VN respectively, each of multiple VQs of the VMDQ network interface card is associated with one VN respectively, the common network interface card Eth 7 is also associated with one VN, and bandwidth of all VNs is set to 1 Gbit/s. According to the requirement of guest operating system 1 on bandwidth and bandwidth of each VN, 11 VNs are allocated to guest operating system 1 for use, where 10 VNs of these 11 VNs come from function modules of the SRIOV network interface card, and 1 VN comes from a function module of the VMDQ network interface card. As can be seen from that, the physical host provided in this embodiment of the present invention implements centralized resource management and allocation of a large number of heterogeneous network interface cards. Referring to FIG. 8, VNs are allocated to guest operating system 2 to guest operating system 5 in the same manner, and details are not described herein again.

To sum up, with the physical host provided in this embodiment of the present invention, VNs are correspondingly constructed for each physical network interface card or each function module of a physical network interface card, where these VNs have a same data structure and interface. In this way, differences in underlying hardware are shielded for an upper layer, a uniform interface and device type are provided, and centralized resource management and allocation are implemented for a large number of heterogeneous network interface cards, thereby further improving network resource utilization. Further, these network interface cards may have same bandwidth (or different bandwidth is set according to a requirement), may be differentiated and sorted by using sequence numbers, and then form an IO virtual pool together at a VMM layer; then according to an actual requirement of a virtual machine, a certain quantity of VNs are taken out and allocated to the virtual machine for use.

The embodiments in this specification are all described in a progressive manner, for same or similar parts in the embodiments, reference may be made to these embodiments, and each embodiment focuses on a difference from other embodiments. Especially, apparatus and system embodiments are basically similar to a method embodiment, and therefore are described briefly; for related parts, reference may be made to partial descriptions in the method embodiment.

It should be noted that the described apparatus embodiment is merely exemplary. The units described as separate parts may or may not be physically separate, and parts displayed as units may or may not be physical units, may be located in one position, or may be distributed on a plurality of network units. A part or all of the modules may be selected according to actual needs to achieve the objectives of the solutions of the embodiments. In addition, in the accompanying drawings of the apparatus embodiments provided by the present invention, connection relationships between modules indicate that the modules have communication connections with each other, which may be implemented as one or more communications buses or signal cables. A person of ordinary skill in the art may understand and implement the embodiments of the present invention without creative efforts.

Based on the foregoing descriptions of the embodiments, a person skilled in the art may clearly understand that the present invention may be implemented by software in addition to necessary universal hardware or by dedicated hardware only, including a dedicated integrated circuit, a dedicated CPU, a dedicated memory, a dedicated component and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for the present invention, software program implementation is a better implementation manner in most cases. Based on such an understanding, the technical solutions of the present invention essentially or the part contributing to the prior art may be implemented in a form of a software product. The software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, or the like) to perform the methods described in the embodiments of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for managing a physical network interface card, applied to a physical host on which a plurality of virtual machines run, the method comprising:
   creating a plurality of virtual network interface cards;
   for each virtual network interface card of the virtual network interface cards:
      configuring a data flow interface for the virtual network interface card, wherein the data flow interface comprises a data packet transmit interface and a data packet receive interface between the virtual network interface card and the physical network interface card;
      configuring a Media Access Control (MAC) address of the virtual network interface card to a MAC address of the physical network interface card;
      configuring a bandwidth of the virtual network interface card;
      registering a sysfs interface and a procfs interface for the virtual network interface card, wherein the sysfs interface and the procfs interface are configured to control registration and destruction of the virtual network interface card; and
      registering the virtual network interface card with an operating system kernel; and
   managing the physical network interface card by managing the virtual network interface cards.

2. The method according to claim 1, wherein managing the physical network interface card comprises, for each of the virtual machines:
   selecting a virtual network interface cards which meets a bandwidth requirement of the virtual machine; and
   allocating the selected virtual network interface card to the virtual machine for use.

3. The method according to claim 1, wherein the physical network interface card comprises a Single Root Input Output Virtualization (SRIOV) network interface card.

4. The method according to claim 3, wherein the physical network interface card comprises a virtual function (VF) and a physical function (PF).

5. The method according to claim 1, wherein the physical network interface card comprises a virtual machine device queue (VMDQ) network interface card.

6. The method according to claim 5, wherein the physical network interface card comprises virtual queues (VQs).

7. The method according to claim 1, wherein the physical network interface cards comprises a common network interface card.

8. The method according to claim 7, wherein the common network interface card is the physical network interface card.

9. A physical host, comprising:
   a physical network interface card;
   a memory comprising virtual machine monitor instructions and a plurality of virtual machines; and
   a processor coupled with the physical network interface card and the memory, wherein the processor is configured to execute the virtual machine monitor instructions to:
      a plurality of virtual network interface cards;
      for each virtual network interface card of the virtual network interface cards:
         configure a data flow interface fix the virtual network interface card, wherein the data flow interface comprises a data packet transmit interface and a data packet receive interface between the virtual network interface card and the physical network interface card;
         configure a Media Access Control (MAC) address of the virtual network interface card to a MAC address of the physical network interface card;
         configure bandwidth of the virtual network interface card;
         register a sysfs interface and a prods interface for the virtual network interface card, wherein the sysfs interface and the proofs interface are configured to control registration and destruction of the virtual network interface card; and
         register the virtual network interface card with an operating system kernel; and
      manage the physical network interface card by managing the virtual network interface cards.

10. The physical host according to claim 9, wherein the processor is further configured to execute the virtual machine monitor instructions for each of the virtual machines to:
   select a virtual network interface card which meets a bandwidth requirement of the virtual machine; and
   allocate the selected virtual network interface card to the virtual machine for use.

11. The physical host according to claim 9, wherein the physical network interface card comprises a Single Root Input Output Virtualization (SRIOV) network interface card, a virtual machine device queue (VMDQ) network interface card, or a common network interface card.

12. The physical host according to claim 11, wherein when the physical network interface card comprises the SRIOV network interface card, the physical network interface card comprises a virtual function (VF) and a physical function (PF), wherein when the physical network interface card comprises the VMDQ network interface card, the physical network interface card comprises virtual queues (VQs), and wherein when the physical network interface card comprises the common network interface card, the common network interface card is the physical network interface card.

13. A method for managing a physical network interface card of a physical host, wherein a plurality of virtual machines run on the physical host, the method comprising:
for each virtual network interface card of a plurality of virtual network interface cards:
configuring a data flow interface for the virtual network interface card, wherein the data flow interface comprises a data packet transmit interface and a data packet receive interface between the virtual network interface card and the physical network interface card;
configuring a Media Access Control (MAC) address of the virtual network interface card to a MAC address of the physical network interface card;
configuring bandwidth of the virtual network interface card;
registering a sysfs interface and a procfs interface for the virtual network interface card, wherein the sysfs interface and the procfs interface are configured to control registration and destruction of the virtual network interface card; and
registering the virtual network interface card with an operating system kernel;
selecting a subset of the virtual network interface cards which meet a bandwidth requirerment of a first virtual machine of the virtual machines; and
allocating the selected subset of virtual network interface cards to the first virtual machine for use.

14. The method according to claim 13, wherein the physical network interface card comprises a Single Root Input Output Virtualization (SRIOV) network interface card, a virtual machine device queue (VMIDQ) network interface card, or a common network interface card.

15. The method according to claim 14, wherein when the physical network interface card comprises the SRIOV network interface card, the physical network interface card comprises a virtual function (VF) and a physical function (PF), wherein when the physical network interface card comprises the VMDQ network interface card, the physical network interface card comprises virtual queues (VQs), and wherein when the physical network interface card comprises the common network interface card, the common network interface card is the physical network interface card.

16. A physical host, comprising:
a physical network interface card;
a memory comprising instructions;
a processor coupled to the memory and the physical network interface card, wherein the processor is configured to execute the instructions to:
for each virtual network interface card of a plurality of virtual network interface cards:
configure a data flow interface for the virtual network interface card, wherein the data flow interface comprises a data packet transmit interface and a data packet receive interface between the virtual network interface card and the physical network interface card;
configure a Media Access Control (MAC) address of the virtual network interface card to a MAC address of the physical network interface card;
configure bandwidth of the virtual network interface card;
register a sysfs interface and a procfs interface for the virtual network interface card, wherein the sysfs interface and the procfs interface are configured to control registration and destruction of the virtual network interface card; and
register the virtual network interface card with an operating system kernel;
select a subset of the plurality of virtual network interface cards which meet a bandwidth requirement of a first virtual machine of the virtual machines; and
allocate the selected subset of virtual network interface cards to the first virtual machine for use.

17. The physical host according to claim 16, wherein the physical network interface card comprises a Single Root Input Output Virtualization (SRIOV) network interface card, a virtual machine device queue (VMDQ) network interface card, or a common network interface card.

18. The physical host according to claim 17, wherein when the physical network interface card comprises the SRIOV network interface card, the physical network interface card comprises a virtual function (VF) and a physical function (PF), wherein when the physical network interface card comprises the VMDQ network interface card, the physical network interface card comprises virtual queues (VQs), and wherein when the physical network interface card comprises the common network interface card, the common network interface card is the physical network interface card.

* * * * *